United States Patent
Bashar et al.

(10) Patent No.: US 9,356,979 B2
(45) Date of Patent: May 31, 2016

(54) TIME AND FREQUENCY SYNCHRONIZATION FOR LTE-ADVANCED NEW CARRIER TYPE

(75) Inventors: Shafi Bashar, Santa Clara, CA (US); Hong He, Beijing (CN); Huaning Niu, Milpitas, CA (US); Jong-Kae Fwu, Sunnyvale, CA (US); Yuan Zhu, Beijing (CN); Xiaogang Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 13/537,271

(22) Filed: Jun. 29, 2012

(65) Prior Publication Data

US 2013/0195070 A1    Aug. 1, 2013

Related U.S. Application Data

(60) Provisional application No. 61/591,641, filed on Jan. 27, 2012.

(51) Int. Cl.
*H04L 5/14* (2006.01)
*H04W 72/04* (2009.01)
(Continued)

(52) U.S. Cl.
CPC ............. *H04L 65/4076* (2013.01); *H04B 1/69* (2013.01); *H04B 7/024* (2013.01); *H04B 7/0413* (2013.01); *H04B 7/0456* (2013.01); *H04B 7/0617* (2013.01); *H04B 7/0639* (2013.01); *H04L 1/0026* (2013.01); *H04L 1/1864* (2013.01); *H04L 1/1896* (2013.01); *H04L 5/0035* (2013.01); *H04L 5/0048* (2013.01); *H04L 5/1469* (2013.01); *H04L 12/189* (2013.01); *H04L 27/2607* (2013.01); *H04L 65/608* (2013.01); *H04W 4/005* (2013.01); *H04W 4/08* (2013.01); *H04W 36/0094* (2013.01); *H04W 52/0216* (2013.01); *H04W 72/04* (2013.01);
(Continued)

(58) Field of Classification Search
None
See application file for complete search history.

(56) References Cited

U.S. PATENT DOCUMENTS

2011/0080885 A1    4/2011    Shin et al.
2011/0158164 A1*   6/2011    Palanki ............. H04W 56/0015
                                                         370/328
(Continued)

FOREIGN PATENT DOCUMENTS

WO    WO-2010128836 A2    11/2010
WO    WO-2013112384 A1     8/2013

OTHER PUBLICATIONS

"Evolved Universal Terrestrial Radio Access (E-UTRA); Physical Channels and Modulation", 3GPP TS 36.211 V10.1.0. Technical Specification Group Radio Access Network. Release 10., (Mar. 2011), 103 pgs.

(Continued)

*Primary Examiner* — Ayaz Sheikh
*Assistant Examiner* — Mariela Vidal Carpio
(74) *Attorney, Agent, or Firm* — Schwegman Lundberg & Woessner, P.A.

(57) ABSTRACT

A particular kind of component carrier that may be used as a secondary cell in an LTE system is a new type carrier that has reduced or eliminated legacy control signaling such as the omission of CRSs. Alternative techniques are described for performing timing and frequency synchronization in the downlink between an eNB and a UE when CRSs are not present in a component carrier. These techniques involve using either channel state information reference signals or UE-specific reference signals.

20 Claims, 11 Drawing Sheets

(51) Int. Cl.
| | |
|---|---|
| *H04L 29/06* | (2006.01) |
| *H04L 27/26* | (2006.01) |
| *H04B 1/69* | (2011.01) |
| *H04W 72/08* | (2009.01) |
| *H04B 7/02* | (2006.01) |
| *H04B 7/04* | (2006.01) |
| *H04B 7/06* | (2006.01) |
| *H04W 4/00* | (2009.01) |
| *H04W 4/08* | (2009.01) |
| *H04L 12/18* | (2006.01) |
| *H04L 1/18* | (2006.01) |
| *H04W 52/02* | (2009.01) |
| *H04W 36/00* | (2009.01) |
| *H04L 1/00* | (2006.01) |
| *H04L 5/00* | (2006.01) |
| *H04W 36/04* | (2009.01) |

(52) U.S. Cl.
CPC ........ *H04W 72/042* (2013.01); *H04W 72/0406* (2013.01); *H04W 72/085* (2013.01); *H04L 1/1887* (2013.01); *H04L 5/0053* (2013.01); *H04W 36/04* (2013.01); *Y02B 60/50* (2013.01)

(56) References Cited

U.S. PATENT DOCUMENTS

| | | | |
|---|---|---|---|
| 2011/0237270 A1 | 9/2011 | Noh et al. | |
| 2011/0305161 A1 | 12/2011 | Ekpenyong et al. | |
| 2011/0310818 A1 | 12/2011 | Lin et al. | |
| 2011/0312316 A1* | 12/2011 | Baldemair | H04L 5/0053 455/422.1 |
| 2011/0319109 A1* | 12/2011 | Kang et al. | 455/507 |
| 2012/0082082 A1* | 4/2012 | Etemad | H04W 72/1215 370/312 |
| 2012/0140743 A1* | 6/2012 | Pelletier | H04W 72/0453 370/335 |
| 2013/0089065 A1* | 4/2013 | Koorapaty et al. | 370/330 |
| 2013/0194931 A1* | 8/2013 | Lee | H04L 5/0053 370/241 |
| 2013/0336224 A1* | 12/2013 | Davydov | H04B 7/2656 370/328 |
| 2014/0086188 A1* | 3/2014 | Hoymann | H04L 5/001 370/329 |

OTHER PUBLICATIONS

"International Application Serial No. PCT/US2013/022272, International Search Report mailed May 16, 2013", 3 pgs.
"International Application Serial No. PCT/US2013/022272, Written Opinion mailed May 16, 2013", 7 pgs.

* cited by examiner

| CSI-RS-SubframeConfig $I_{CSI-RS}$ | | CSI-RS periodicity $T_{CSI-RS}$ (subframes) | CSI-RS subframe offset $\Delta_{CSI-RS}$ (subframes) |
|---|---|---|---|
| | 0 – 4 | 5 | $I_{CSI-RS}$ |
| | 5 – 14 | 10 | $I_{CSI-RS} - 5$ |
| | 15 – 34 | 20 | $I_{CSI-RS} - 15$ |
| | 35 – 74 | 40 | $I_{CSI-RS} - 35$ |
| | 75 – 154 | 80 | $I_{CSI-RS} - 75$ |
| Frame structure type 1 | 155 | 1 | $I_{CSI-RS}$ |
| | 156-157 | 2 | $I_{CSI-RS}$ |
| | 158-160 | 3 | $I_{CSI-RS} - 2$ |
| | 161-164 | 4 | $I_{CSI-RS} - 1$ |
| Frame structure type 2 | 155 | 5 | 0,3,4 |
| | 156 | 5 | 0,3 |
| | 157 | 5 | 0,4 |
| | 158 | 5 | 3,4 |

| | | | CSI-RS | CSI-RS |
|---|---|---|---|---|
| Subframe Index | 0 | 1 | 2 | 3 | 4 |

| CSI reference signal configuration | Number of CSI reference signals configured | | | | | |
|---|---|---|---|---|---|---|
| | 1 or 2 | | 4 | | 8 | |
| | $(k',l')$ | $n_s \bmod 2$ | $(k',l')$ | $n_s \bmod 2$ | $(k',l')$ | $n_s \bmod 2$ |
| 0 | (9,5) | 0 | (9,5) | 0 | (9,5) | 0 |
| 1 | (11,2) | 1 | (11,2) | 1 | (11,2) | 1 |
| 2 | (9,2) | 1 | (9,2) | 1 | (9,2) | 1 |
| 3 | (7,2) | 1 | (7,2) | 1 | (7,2) | 1 |
| 4 | (9,5) | 1 | (9,5) | 1 | (9,5) | 1 |
| 5 | (8,5) | 0 | (8,5) | 0 | | |
| 6 | (10,2) | 1 | (10,2) | 1 | | |
| 7 | (8,2) | 1 | (8,2) | 1 | | |
| 8 | (6,2) | 1 | (6,2) | 1 | | |
| 9 | (8,5) | 1 | (8,5) | 1 | | |
| 10 | (3,5) | 0 | | | | |
| 11 | (2,5) | 0 | | | | |
| 12 | (5,2) | 1 | | | | |
| 13 | (4,2) | 1 | | | | |
| 14 | (3,2) | 1 | | | | |
| 15 | (2,2) | 1 | | | | |
| 16 | (1,2) | 1 | | | | |
| 17 | (0,2) | 1 | | | | |
| 18 | (3,5) | 1 | | | | |
| 19 | (2,5) | 1 | | | | |
| 32 | (9,5) | 0,1 | (9,5) | 0,1 | (9,5) | 0,1 |
| 33 | (8,5) | 0,1 | (8,5) | 0,1 | | |
| 34 | (3,5) | 0,1 | | | | |
| 35 | (2,5) | 0,1 | | | | |
| 36 | (9,5) | 0,1 | (9,5) | 0,1 | (9,5) | 0 |
| 37 | (9,5) | 0,1 | (9,5) | 0 | (9,5) | 0 |
| 38 | (8,5) | 0,1 | (8,5) | 0 | | |

Rows 0–38 apply to Frame structure type 1 and 2.

Fig. 4

| CSI reference signal configuration | Number of CSI reference signals configured | | | | | |
|---|---|---|---|---|---|---|
| | 1 or 2 | | 4 | | 8 | |
| | $(k',l')$ | $n_s \bmod 2$ | $(k',l')$ | $n_s \bmod 2$ | $(k',l')$ | $n_s \bmod 2$ |
| Frame structure type 1 and 2 | | | | | | |
| 0 | (9,5) | 0 | (9,5) | 0 | (9,5) | 0 |
| 1 | (11,2) | 1 | (11,2) | 1 | (11,2) | 1 |
| 2 | (9,2) | 1 | (9,2) | 1 | (9,2) | 1 |
| 3 | (7,2) | 1 | (7,2) | 1 | (7,2) | 1 |
| 4 | (9,5) | 1 | (9,5) | 1 | (9,5) | 1 |
| 5 | (8,5) | 0 | (8,5) | 0 | | |
| 6 | (10,2) | 1 | (10,2) | 1 | | |
| 7 | (8,2) | 1 | (8,2) | 1 | | |
| 8 | (6,2) | 1 | (6,2) | 1 | | |
| 9 | (8,5) | 1 | (8,5) | 1 | | |
| 10 | (3,5) | 0 | | | | |
| 11 | (2,5) | 0 | | | | |
| 12 | (5,2) | 1 | | | | |
| 13 | (4,2) | 1 | | | | |
| 14 | (3,2) | 1 | | | | |
| 15 | (2,2) | 1 | | | | |
| 16 | (1,2) | 1 | | | | |
| 17 | (0,2) | 1 | | | | |
| 18 | (3,5) | 1 | | | | |
| 19 | (2,5) | 1 | | | | |
| 32 | (9,5) | 0,1 | (9,5) | 0,1 | (9,5) | 0,1 |
| 33 | (8,5) | 0,1 | (8,5) | 0,1 | | |
| 34 | (3,5) | 0,1 | | | | |
| 35 | (2,5) | 0,1 | | | | |
| 36 | (9,5) | 0,1 | (9,5) | 0,1 | (9,5) | 0 |
| 37 | (9,5) | 0,1 | (9,5) | 0 | (9,5) | 0 |
| 38 | (8,5) | 0,1 | (8,5) | 0 | | |

| UERS₁ | UERS₁ | UERS₁ | UERS₁ | UERS₁ | UERS₁ | UERS₁ | UERS₁ | UERS₁ | UERS₁ |
|---|---|---|---|---|---|---|---|---|---|
|  |  |  |  |  |  |  |  |  |  |
|  |  |  |  |  |  |  |  |  |  |
|  |  |  |  |  |  |  |  |  |  |
| UERS₂ | UERS₂ | UERS₂ | UERS₂ | UERS₂ | UERS₂ | UERS₂ | UERS₂ | UERS₂ | UERS₂ |
|  |  |  |  |  |  |  |  |  |  |
|  |  |  |  |  |  |  |  |  |  |
|  |  |  |  |  |  |  |  |  |  |
| UERS₃ | UERS₃ | UERS₃ | UERS₃ | UERS₃ | UERS₃ | UERS₃ | UERS₃ | UERS₃ | UERS₃ |
|  |  |  |  |  |  |  |  |  |  |
|  |  |  |  |  |  |  |  |  |  |
|  |  |  |  |  |  |  |  |  |  |
| UERS₄ | UERS₄ | UERS₄ | UERS₄ | UERS₄ | UERS₄ | UERS₄ | UERS₄ | UERS₄ | UERS₄ |
|  |  |  |  |  |  |  |  |  |  |

Fig. 11

| UERS$_1$ | UERS$_2$ | UERS$_1$ | UERS$_2$ | UERS$_1$ | UERS$_2$ | UERS$_1$ | UERS$_2$ | UERS$_1$ | UERS$_2$ |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| UERS$_3$ | UERS$_4$ | UERS$_3$ | UERS$_4$ | UERS$_3$ | UERS$_4$ | UERS$_3$ | UERS$_4$ | UERS$_3$ | UERS$_4$ |

Fig. 12

TIME AND FREQUENCY SYNCHRONIZATION FOR LTE-ADVANCED NEW CARRIER TYPE

PRIORITY CLAIM

This application claims the benefit of priority under 35 U.S.C. 119(e) to U.S. Provisional Patent Application Ser. No. 61/591,641, filed on Jan. 27, 2012, which is incorporated herein by reference in its entirety.

BACKGROUND

Carrier aggregation is a feature of LTE-Advanced (Long Term Evolution-Advanced or LTE-A) as part of Release 10 of the LTE specification by the 3rd Generation Partnership Project (3GPP) for increasing data rates by aggregating multiple carriers together to increase total bandwidth. The multiple carriers, referred to as component carriers, may occupy contiguous or non-contiguous bandwidths. A component carrier is also sometimes referred to as a serving cell. For time-division duplex (TDD), a serving cell is a single carrier frequency where, for uplink and downlink transmissions between a user equipment (UE) and an enhanced Node-B (eNB) occur in different subframes. For frequency division duplex (FDD), a serving cell includes two different carrier frequencies or downlink and uplink transmissions. Each UE has a single serving cell, referred to as the primary cell (PCell), that provides all the necessary control functions used to communicate with the eNB. All other serving cells are referred to as secondary cells (SCells). Improved techniques for maintaining timing and frequency synchronization are needed for certain types of SCells.

BRIEF DESCRIPTION OF THE DRAWINGS

FIG. 4 is a table showing the mapping of CSI reference signals to resource elements for OFDM symbols with a normal cyclic prefix.
FIG. 5 is a table showing the mapping of CSI reference signals to resource elements for OFDM symbols with an extended cyclic prefix.
FIGS. 11 and 12 illustrate examples of UE-specific reference signals mapped to resource blocks allocated to an enhanced PDCCH.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

LTE systems use pilot signals, called reference signals (RS), in order for the UE and eNB to estimate the characteristics of the radio frequency channel over which the devices communicate. One such RS are the cell-specific reference signals, also referred to as common reference signals (CRSs), that are transmitted in the downlink that used by the UE in PCells and SCells for channel estimation and also maintaining timing and frequency synchronization with the eNB. A particular kind of component carrier that may be used as an SCell, however, is a so-called new type carrier that, in order to increase spectral and energy efficiency, has at least reduced or eliminated legacy control signaling such as the omission of CRSs. Described herein are alternative techniques for performing timing and frequency synchronization in the downlink between an eNB and a UE when CRSs are not present in a component carrier.

LTE Downlink

Figure 1:
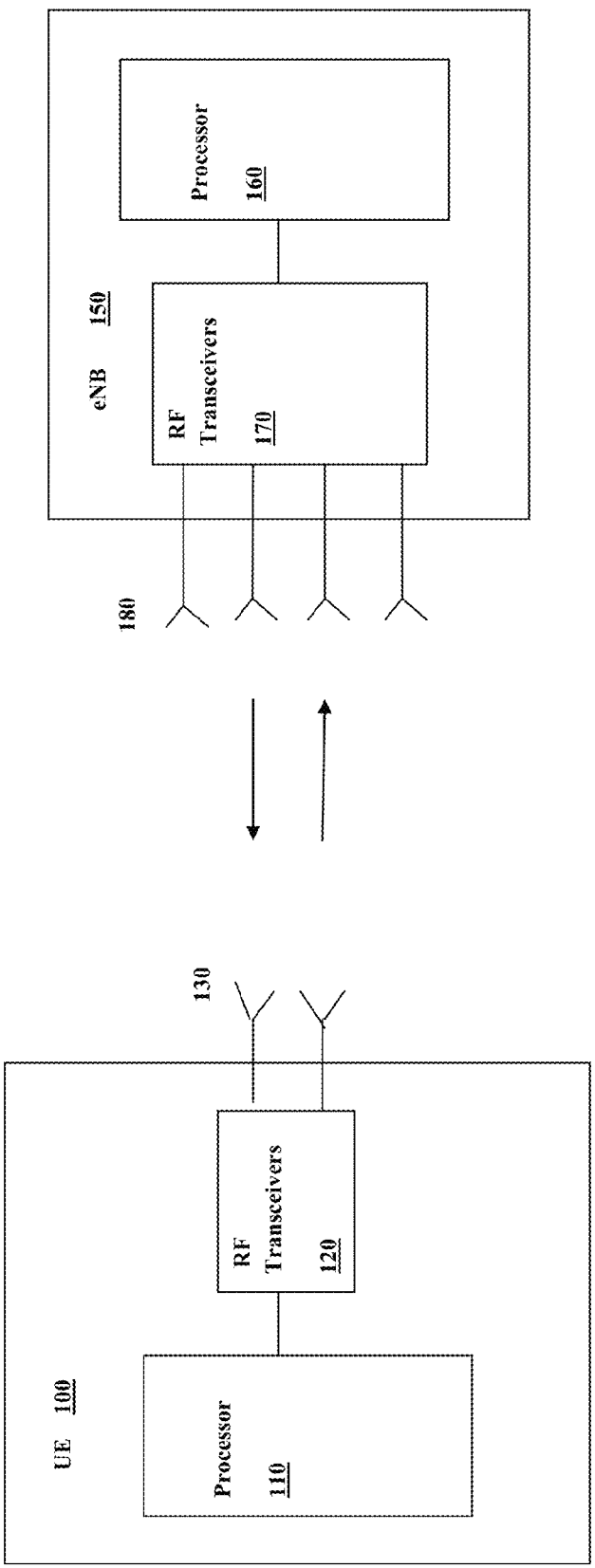
FIG. 1 illustrates a UE and an eNB.

The physical layer of LTE is based upon orthogonal frequency division multiplexing (OFDM) for the downlink and a related technique, single carrier frequency division multiplexing (SC-FDM), for the uplink. FIG. 1 shows an example of a UE 100 and an eNB 150. The UE and eNB incorporate processing circuitries 110 and 160, respectively, each of which is intended to represent any type of hardware/software configuration for performing the processing functions as described below. The processing circuitry 110 in the UE is interfaced to a plurality of RF transceivers 120 that are each connected to one of a plurality of antennas 130. The processing circuitry 160 in the eNB is interfaced to a plurality of RF transceivers 170 that are each connected to one of a plurality of antennas 180. To transmit data over the downlink, the processing circuitry 160 forms a data stream into codewords. A modulation mapper maps the code words into complex modulation symbols according to a modulation scheme such as quadrature amplitude modulation (QAM). In a MIMO (Multi-input multi-output) mode where multiple layers of data are transmitted by the multiple antennas, a layer mapper maps each of the complex modulation symbols into one of the multiple transmission layers. A precoder may then map each of the transmission layers into one of a plurality of antenna ports, where an antenna port is a physical antenna, or combination thereof, that is served by a separate OFDM transmitter as described below. The antenna-specific symbols produced by the precoder are then distributed to a resource element (RE) mapper for each OFDM transmitter that maps each such symbol to a specific RE. As described below, an RE corresponds to particular OFDM subcarrier transmitted during a particular time interval. The transmitted layers are received by each of the antennas 130 of the UE with a separate OFDM receiver where the process is essentially reversed by OFDM and MIMO demodulating to recover the transmitted data.

Figure 2:
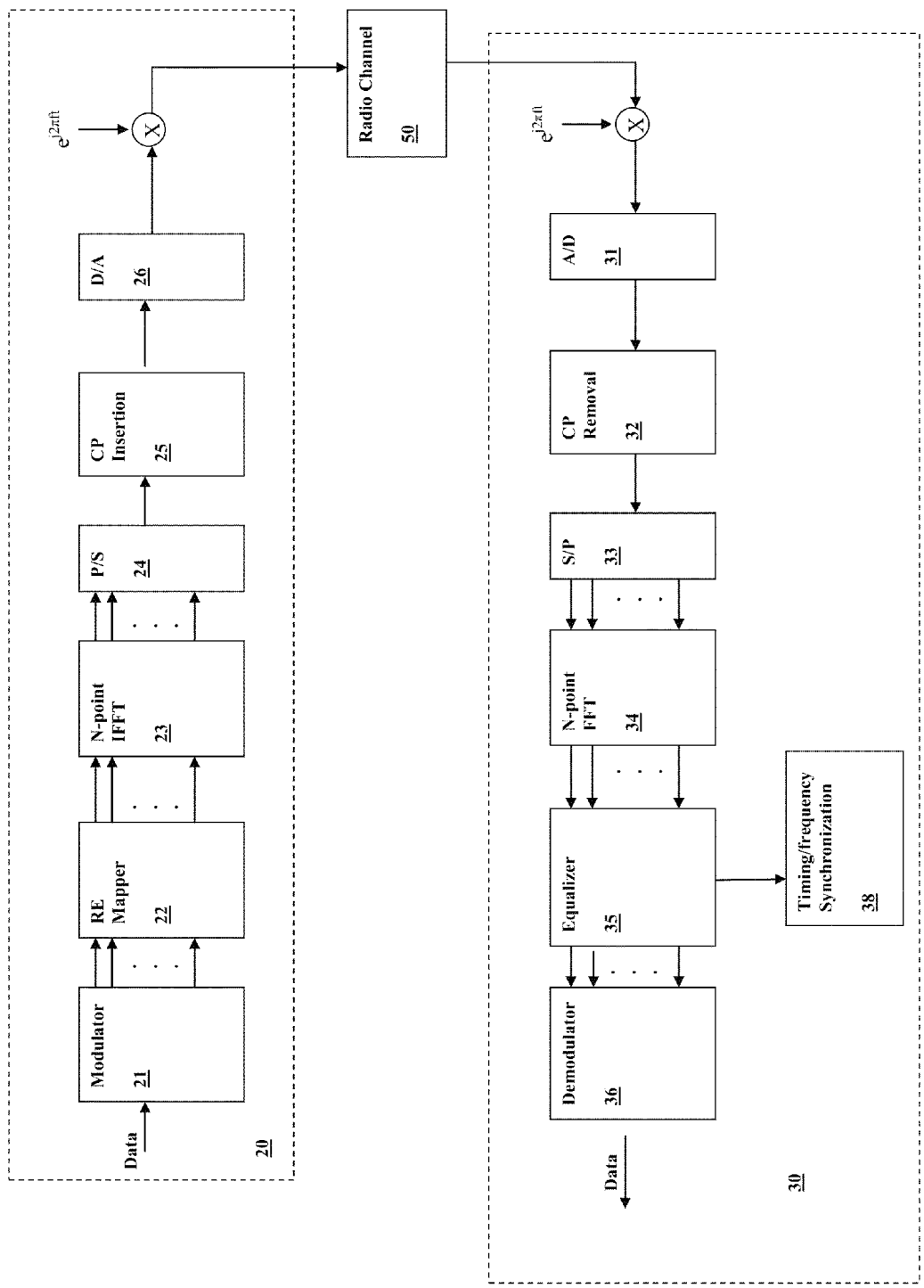
FIG. 2 illustrates an OFDM transmitter and an OFDM receiver.

FIG. 2 illustrates a block diagram of an OFDM transmitter 20 as would be implemented by the processing circuitry and RF transceiver of the eNB and an OFDM receiver 30 as would be implemented by the processing circuitry and RF transceiver of the UE for forming a portion of the downlink. The RE mapper 22 receives complex modulation symbols from the modulator 21, which represents the modulation mapper and the layer mapper/precoder as described above, and assigns them to blocks of N complex-valued symbols. Because these complex-valued symbols are used to determine the amplitude and phase of a particular sub-carrier, they are referred to as frequency-domain symbols. The N frequency-domain symbols, each being a complex number representing a plurality of the input bits, are next input to an N-point inverse fast Fourier transform (IFFT) 23 and converted to a serial discrete-time signal by parallel-to-serial converter 24.

A cyclic prefix is added at block 25 in order to provide enhanced immunity to multi-path distortion. The resulting discrete-time signal thus constitutes N samples of a time domain waveform representing a sum of orthogonal sub-carrier waveforms with each sub-carrier waveform being modulated by a frequency-domain symbol, referred to as an OFDM symbol. The time domain waveform samples are converted into an analog waveform by digital-to-analog converter 26, upmixed with a radio-frequency carrier frequency, and transmitted over the radio channel 50. At the receiver 30, the received signal is downmixed with the carrier frequency, filtered and sampled by A/D converter 31. After removal of the cyclic prefix and conversion from serial to parallel as depicted by blocks 32 and 33, respectively, an N-point FFT is performed at block 34 to recover the frequency-domain symbols, which symbols are multiplied by a complex amplitude and phase to compensate for the channel delay spread at equalizer 36 and then MIMO demodulated at block 35 along with frequency-domain symbols from the OFDM receivers of other antennas to generate the transmitted data stream.

According to the 3GPP LTE specification, the downlink transmission is organized into radio frames each having a duration of 10 ms. Each radio frame consists of 10 sub-frames, each sub-frame consisting of two consecutive 0.5 ms slots. Each slot comprises six OFDM symbols for an extended cyclic prefix and seven OFDM symbols for a normal cyclic prefix. Data are mapped on a time/frequency resource grid consisting of elementary units called resource elements (REs) that are uniquely identified by the antenna port, sub-carrier position, and OFDM symbol index within a radio frame. A group of resource elements corresponding to twelve consecutive subcarriers within a single slot is referred to as a resource block (RB).

Time and Frequency Synchronization

In order to coherently demodulate the OFDM signal, the UE must establish timing and frequency synchronization with eNB. The former refers to correspondence between the time domain samples of the transmitted signal and the boundaries between frames, subframes and OFDM symbols. The latter refers to correspondence between the downmixing frequency and the transmitted carrier frequency. The UE initially establishes time and frequency synchronization with the eNB, as well as acquiring information about the specific cell, through a cell search procedure that involves a correlation operation performed on the primary and secondary synchronization signals (PSS and SSS, respectively) that are included in designated symbols of designated slots in every subframe on the 31 subcarriers on each side of the DC subcarrier. In some cases, positioning reference signals (PRS) transmitted by the eNB can be used in place of the PSS/SSS signals for initial synchronization.

After initial establishment of timing and frequency synchronization, it is necessary to perform ongoing fine adjustments for optimum operation. In the case of timing synchronization, as long as any timing offset with respect to the OFDM symbol boundary is less than the difference between the length of the cyclic prefix and the maximum channel delay spread, no inter-symbol interference will occur, and the phase shift resulting from the timing offset can be corrected by the equalizer 36 of the OFDM receiver. To provide robust immunity against changes in the maximum channel delay spread (e.g., from changing multipath distortion), however, it is desirable to minimize the timing offset with fine adjustments that are performed continually to compensate for timing drift. In the case of frequency synchronization, continual fine adjustments to minimize any frequency offset are necessary to compensate for Doppler frequency shifts due to the mobility of the UE as well as for oscillator drift at the UE and/or eNB. An OFDM signal is very sensitive to frequency offset due to the close spacing between the subcarriers, and any significant frequency offset will destroy the orthogonality between the subcarriers resulting in inter-carrier interference.

In order to perform fine adjustments to the timing and frequency synchronization as discussed above, a UE may use reference signals transmitted by the eNB in designated resource elements. This function may be performed by the timing/frequency synchronization block 38 of the UE's OFDM receiver as shown in FIG. 2. A timing offset with respect to an OFDM symbol boundary in the time domain results in a proportional phase shift of the demodulated frequency-domain symbols that varies in accordance with the subcarrier frequency. The timing offset may therefore be estimated by measuring the phase shift of a reference signal across different subcarrier frequencies, and a more precise estimate may be obtained by averaging the measured phase shift at different times. A frequency offset results in a proportional phase shift of the demodulated frequency-domain symbols that varies with time but is independent of the particular subcarrier. The frequency offset may therefore be estimated by measuring the phase shift of a reference signal at different times, with a more precise estimate obtained by averaging the phase shift at different subcarrier frequencies.

After estimation of the timing offset, the starting point for the FFT in the OFDM receiver may be adjusted accordingly by the timing/frequency synchronization block 38 of the UE's OFDM receiver. The timing/frequency synchronization block 38 may provide compensation for the estimated frequency offset either by adjusting the oscillator used to downmix the received signal or by digital filtering of the sampled received signal before performing the FFT.

As noted above UE attached to a conventional LTE cell may utilize CRSs for timing/frequency synchronization. CRSs are transmitted in designated resource elements using antenna ports p0 through p3. Also as noted above, however, a secondary cell new type carrier may not include CRSs. Described below are embodiments for dealing with this situation.

CSI Reference Signals for Timing/Frequency Synchronization

Reference signals such as the aforementioned CRSs are used by the UE to estimate the channel for demodulation and for timing/frequency synchronization. Other reference signals transmitted in the downlink are used by the UE for measurement of channel state information (CSI) in order to provide feedback to the eNB. These reference signals are called CSI reference signals or CSI-RSs. According to the LTE specification (3GPP TS 36.211 V10.1.0, March 2011), CSI-RSs may be transmitted via up to eight antenna ports with a periodicity of every 5, 10, 20, 40, or 80 subframes. The CSI-RSs as defined in Release 10 are specifically intended to be used by terminals to acquire channel-state information in the case where demodulation reference signals are used for channel estimation. These CSI-RSs have a significantly lower time/frequency density, thus resulting in less overhead compared to the CRSs.

The 5 ms to 80 ms periodicities of CSI-RSs as presently defined are too sparse to perform accurate frequency and timing tracking. For example, for a frequency offset value of $\Delta f$, the phase rotation $\Delta \phi$ between two RS symbols spaced $\Delta t$ second apart is: $\Delta \phi = 2\pi \Delta f \Delta t$. At the UE, the value of phase rotations $\Delta \phi = 2\pi k + \theta$, where k is integer valued and $\theta$ is in the range $[-\pi, \pi]$, are not distinguishable. Therefore, for a given value of $\Delta t$, a UE will only be able to correct a frequency offset if $\Delta f \leq \frac{1}{2} \Delta t$. If CSI-RS are configured with periodicity of 5 ms, for example, then the distance between two RS symbols in two sets of subframes containing CSI-RS will be 5 ms, i.e. $\Delta t=5$ ms. The UE would then be able to estimate a frequency error only in the range of ±100 Hz. Using the subsequent CSI-RS symbols within a subframe, a UE would be able to estimate a frequency error of ±14000 Hz. The granularity of error for fine frequency tracking would be very large for a practical implementation, however, if CSI-RS symbols within a single subframe are used for frequency tracking.

Described below are techniques by which the timing/frequency synchronization block 38 of the UE's OFDM receiver may utilize CSI-RSs for making adjustments to the timing and/or frequency synchronization. Embodiments of these techniques include transmitting CSI-RSs with reduced periodicity, transmitting CSI-RSs with a modified RS pattern, and a combination of both reduced periodicity and a modified RS pattern.

Figures 3A, 3B:
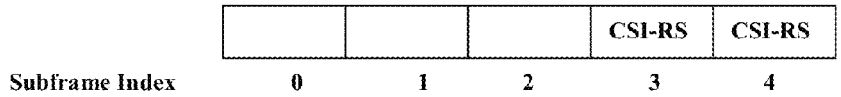
FIG. 3A is a table showing subframe periodicities of CSI reference signals.
FIG. 3B shows an example of the mapping of CSI reference signals for Type 2 TDD frames.

As discussed above, the symbol distance between two RSs is important in calculating phase rotation in order to obtain the proper operating point. An option to adjust the periodicity of CSI-RS would be beneficial to select the proper operation range for enhancing frequency offset estimation. This decision can be made based on per UE basis and controlled by the eNB or the network. In order to support CSI-RS transmission with reduced and/or configurable periodicity, FIG. 3A illustrates a modification of Table 6.10.5.3-1 as defined in the above-referenced TS 36.211V10.1.0. For Type 1 frame structures (FDD), the modified table includes added entries for CSI-RS-SubframeConfig $I_{CSI-RS}$ numbered 155 through 164 that have periodicities of every 1, 2, 3, or 4 subframes. For Type 2 frame structures (FDD), the modified table includes added entries for CSI-RS-SubframeConfig $I_{CST-RS}$ numbered 155 through 158 that have periodicities of every 5 subframes. The CSI-RS subframe offsets are also given for the added CSI-RS-SubframeConfig $I_{CSI-RS}$ entries that denote the offset of the subframes carrying the CSI-RSs within the period. Note that for Type 2 frame structures, multiple offsets are given for the configurations numbered 155 through 158, all with a periodicity of 5 subframes. As an example, FIG. 3B illustrates the mapping of CSI-RSs for the configuration $I_{CSI-RS}=158$ showing two CSI-RS subframes (3,4) transmitted every 5 subframes. Using the reduced periodicity of 1, 2, 3 and 4 subframes as shown in FIG. 3, a UE will be able to estimate frequency errors of ±500 Hz, ±250 Hz, ±167 Hz and ±125 Hz respectively.

As noted earlier, if the RSs used for phase rotation calculation are spaced very closely in time, the required granularity of the phase estimation will not be achievable. This is due to practical implementation limitations such as quantization error, fixed point implementations, etc. On the other hand, if the RSs are spaced very far apart in time, then UE will not be able to distinguish the phase rotations $\Delta\phi=2\pi$ k+θ with different k values. This situation can be dealt with by having the RSs positioned in a way such that the RS pairs used for phase rotation estimation have a more optimal distance in time, either by separating the existing RSs or by adding new RSs. Additional RSs do not necessarily have to align in frequency. In order to achieve robustness with a frequency selective channel, however, it is desirable to place the RSs in the same subcarrier (e.g., place the RS pair in positions $(k_1,l_1)$ and $(k_1,l_2)$ where k and l are the subcarrier and OFDM symbol indices, respectively, for a single resource block). The additional overhead to enable the frequency estimation can be adjustable.

Example embodiments of a modified CSI-RS pattern for enabling time/frequency synchronization are illustrated in FIGS. 4 and 5. FIG. 4 is a modified version of Table 6.10.5.2-1 in the above-referenced TS 36.211V10.1.0 (2011-03) for OFDM symbols with a normal cyclic prefix where entries added for the additional CSI-RSs are designated as CSI reference signal configurations 32 through 38. FIG. 5 is a modified version of Table 6.10.5.2-2 in the above-referenced TS 36.211V10.1.0 (2011-03) for OFDM symbols with an extended cyclic prefix where entries added for the additional CSI-RSs are designated as CSI reference signal configurations 28 through 34. The tables in FIGS. 4 and 5 show the mappings of CSI-RSs to REs for both Type 1 frames used in frequency division duplex (FDD) mode and for Type 2 frames used in time division duplex (TDD) mode.

The table in FIG. 4 shows the mapping of CSI reference signals to resource elements (k,l), where k and l are indices in the frequency and time domain, respectively, and where:
k=k'+m+0 for antenna ports p15 and p16,
k=k'+m+−6 for antenna ports p17 and p18,
k=k'+m+−1 for antenna ports p19 and p20,
k=k'+m+−7 for antenna ports p21 and p22,
m=0, 1, . . . $N_{RB}$−1, where $N_{RB}$ is the number of resource blocks in a downlink slot,
l=l'+l", and
l"=0, 1

The table in FIG. 5 similarly shows the mapping of CSI reference signals to resource elements (k,l), where k and l are indices in the frequency and time domain, respectively, and where:
k=k'+m+0 for antenna ports p15 and p16,
k=k'+m+−3 for antenna ports p17 and p18,
k=k'+m+−6 for antenna ports p19 and p20,
k=k'+m+−9 for antenna ports p21 and p22,
m=0, 1, . . . $N_{RB}$−1, where $N_{RB}$ is the number of resource blocks in a downlink slot,
l=l'+l", and
l"=0, 1

Figure 6:
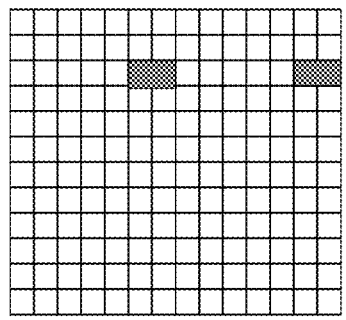
FIGS. 6 through 10 illustrate examples of CSI reference signals mapped to resource elements for different antenna ports.
Figure 6:
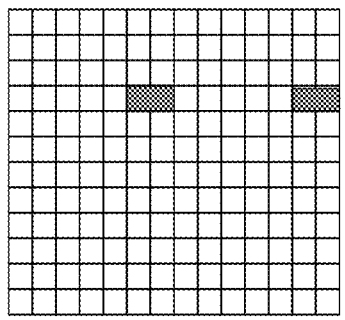
Figure 6:
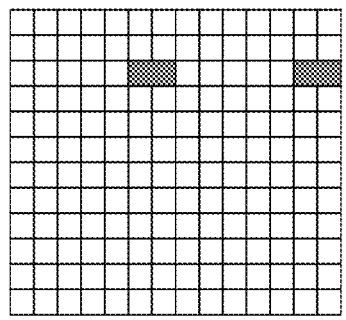
Figure 6:
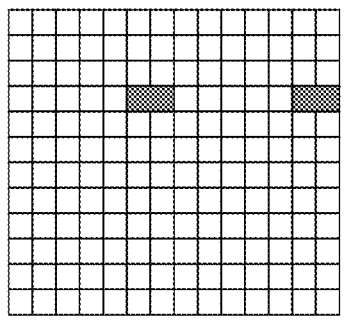
Figure 6:
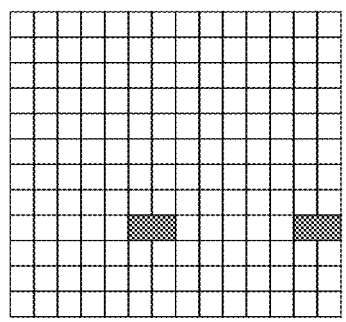
Figure 6:
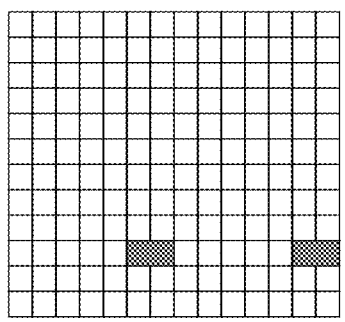
Figure 6:
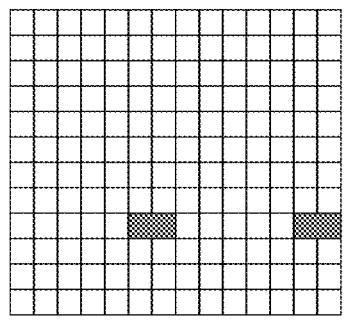
Figure 6:
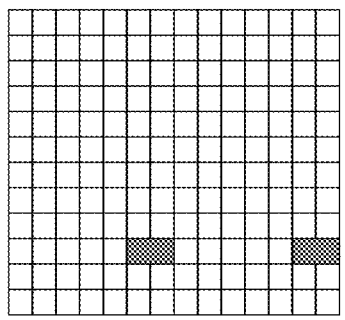
Figure 7:
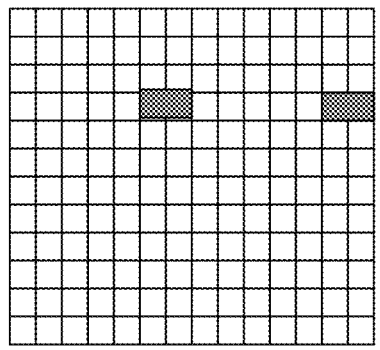
Figure 7:
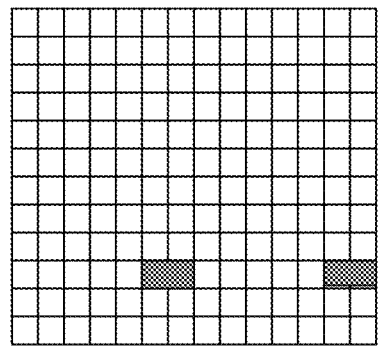
Figure 7:
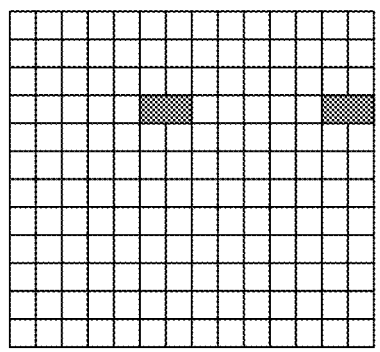
Figure 7:
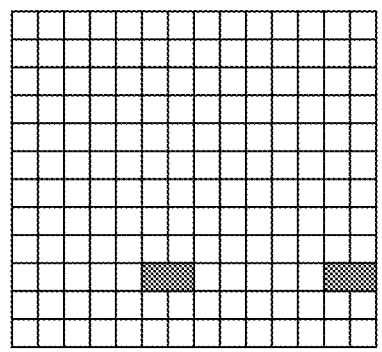
Figure 8:
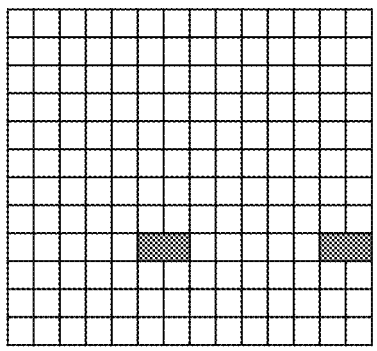
Figure 8:
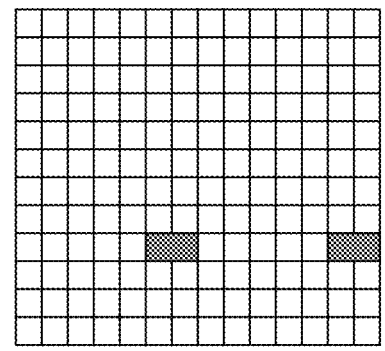
Figure 9:
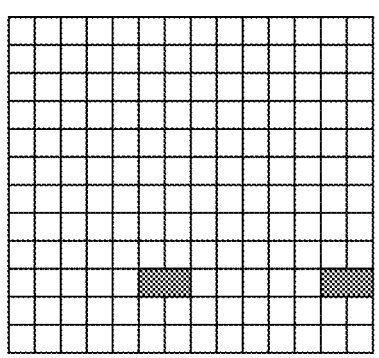
Figure 9:
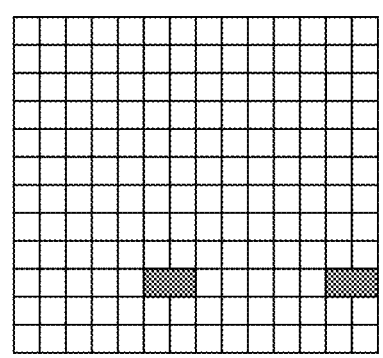
Figure 10:
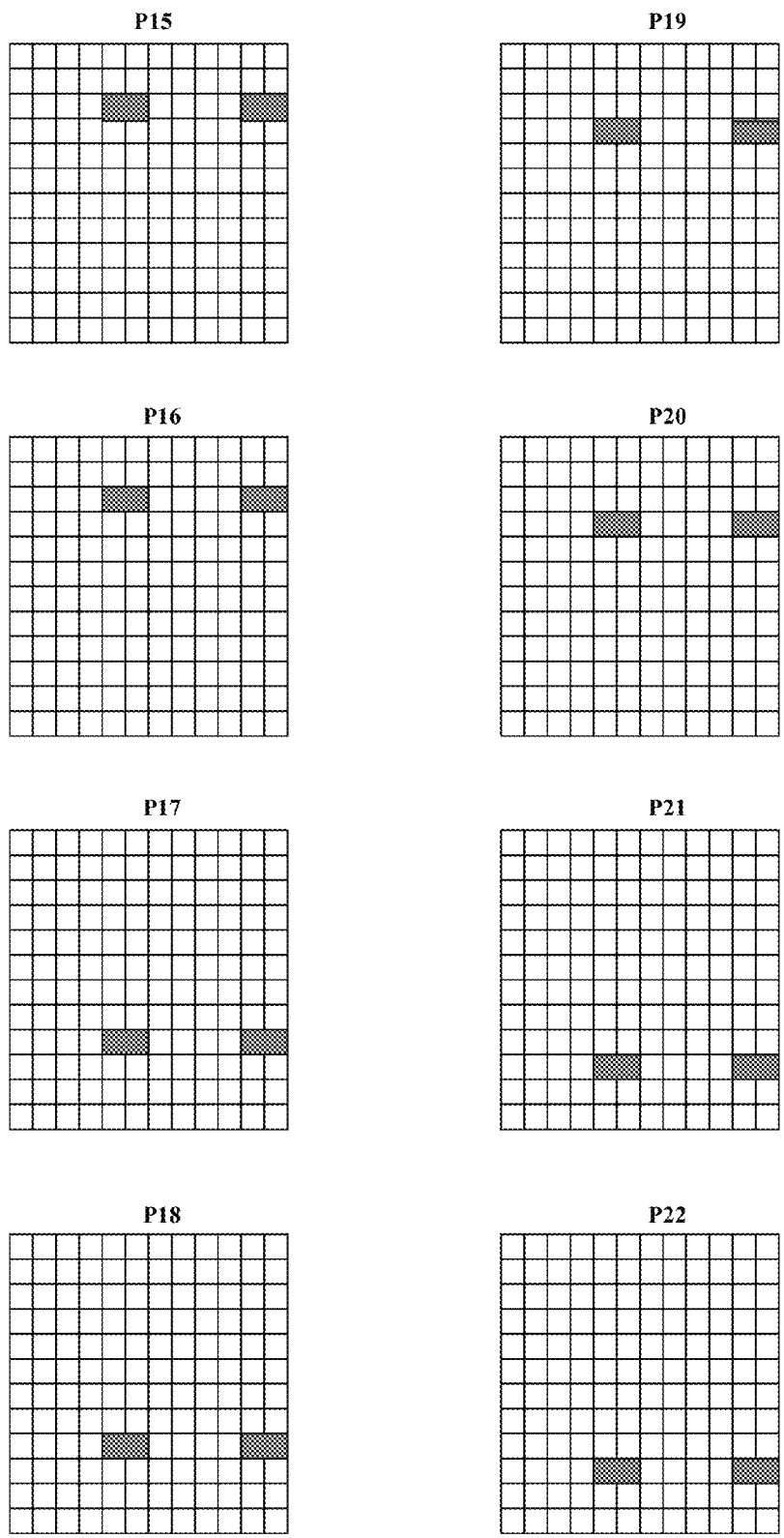

It is possible to use only a subset of the additionally introduced CSI-RSs shown in FIGS. 4 and 5. FIGS. 6 through 10 illustrate the mapping of CSI-RSs according to the tables of FIGS. 4 and 5 by showing, for each of the designated antenna ports, resource grids for the two consecutive resource blocks contained within a subframe where CSI-RSs are mapped. Each square of the grid is an RE with coordinates (k,l), where k and l are indices in the frequency and time domain, respectively, and where the bottom left-hand corner square of each grid corresponds to the origin with coordinates (0,0). FIG. 6 shows the mapping of CSI reference signals according to CSI configuration 32 (normal cyclic prefix) for each of eight antenna ports p15 through p22. FIG. 7 shows the mapping of CSI reference signals according to CSI configuration 33 (normal cyclic prefix) for each of four antenna ports p15 through p18. FIG. 8 shows the mapping of CSI reference signals according to CSI configuration 34 (normal cyclic prefix) for each of two antenna ports p15 and 16. FIG. 9 shows the mapping of CSI reference signals according to CSI configuration 35 (normal cyclic prefix) for each of two antenna ports p15 and 16. FIG. 10 shows the mapping of CSI reference signals according to CSI configuration 28 (extended cyclic prefix) for each of eight antenna ports p15 through p22.

UE Specific Reference Signals for Timing/Frequency Synchronization

In another embodiment, fine adjustments and tracking of timing/frequency synchronization, after initial synchronization with PSS/SSS or PRS signals, are performed using UE-specific reference signals (UERSs) when CRSs are not present in a component carrier. UERSs are precoded reference signals that intended for use in data demodulation by a particular UE. UERSs are transmitted only in resource blocks allocated to the particular UE and precoded with the same precoder used for transmitting data to the UE.

A problem with using UERSs for timing/frequency synchronization purposes is that UERSs are only transmitted when there is an allocation for certain UE. For timing/frequency tracking and Doppler spread estimation, it is desirable to have UERSs available periodically across different subframes that are precoded the same precoder. In order to solve this problem, a modified design for an enhanced Physical Downlink Control Channel (ePDCCH) is employed. In this design, the ePDCCH is mapped to a specified number of RBs of each slot in each subframe. The UERSs are transmitted with predefined precoding in each of the RBs to which the ePDCCH is mapped. In one embodiment, the UERSs are transmitted in each of the specified resource blocks with predefined precoding that remains the same from RB to RB in the time domain but changes from RB to RB in the frequency domain. In another embodiment, the UERSs are transmitted in each of the specified resource blocks with predefined precoding that alternates from RB to RB in the time domain.

FIG. 11 shows an example of consecutive FDD subframes each containing two slots, where 21 RBs are transmitted within each slot. In the figure, each square represents a single RB mapped according to frequency along the vertical axis and according to time along the horizontal axis. In this example, 4 of the RBs out the total of 21 in each slot are reserved as the resource for ePDCCH with predefined precoding, where UERS is always transmitted. Each UERS is precoded with a precoder designated by a subscript so that four differently precoded UERSs are designated as $UERS_1$, $UERS_2$, $UERS_3$, or $UERS_4$ in each of the RBs that contain a UERS. For the selected reserved 4 RBs, each RB may be precoded with a random precoder selected from a complete subset of the rank-1 or rank-2 codebook. For example, with a rank-1 transmission of ePDCCH with four transmit antennas, the precoder used in the first ePDCCH RB may be [1 1 1 1], the second precoder may be [1 1 −1 −1], the third precoder may be [1 −1 −1 1], and the last precoder may be [1 −1 1 −1].

In order to reduce control signaling overhead, it may be desired to reserve only 3 RBs per slot, for example, for the ePDCCH. In that case, only the first three precoders can be selected for precoding the UERSs across the different frequencies. The size of the ePDCCH with pre-defined precoding and the allocated resource for component carrier of the Scell can be configured and signaled by the eNB to the UE through the PCell carrier.

If the number of transmit antennas is large, and the resource reserved for ePDCCH is small, the random beam pattern as described above may not offer adequate spatial coverage for the control transmission. This is not desirable since some UEs may suffer ePDCCH demodulation performance loss. In this case, the precoder can rotate from RB to RB across a subframe following a pattern. In the example shown in FIG. 12, each successive UERS in an RB allocated for the ePDCCH is precoded with a different precoder that alternates with each RB. The UE may then perform frequency synchronization using one or more of the alternately precoded UERSs in each of the designated frequency ranges. The pattern of UERS precoding can be flexible and may be signaled to the UE by the eNB via the PCell carrier.

Example Embodiments

In a first embodiment, a device operating as a UE in an LTE network comprises: an RF transceiver for providing an LTE air interface for communicating with a base station operating as an eNB; processing circuitry configured to attach to the eNB via component carriers configured as primary and secondary cells (PCells and SCells), wherein the secondary cell carrier does not include CRSs; and wherein the processing circuitry is further configured to receive channel state information reference signals (CSI reference signals) over the SCell carrier and further configured to use the CSI reference signals for time and frequency synchronization.

In a second embodiment, a device operating as an eNB in an LTE network, comprises: an RF transceiver for providing an LTE air interface for communicating with UE; processing circuitry configured to attach to UEs via component carriers configured as primary and secondary cells (PCells and SCells), wherein the secondary cell carrier does not include CRSs; and wherein the processing circuitry is further configured to transmit CSI reference signals over the SCell carrier for use by the UE in performing time and frequency synchronization.

In either of first or second embodiments, the processing circuitry may be configured to receive or transmit the CSI reference signals mapped to specified resource elements every one, two, three, or four subframes for Type 1 frame structures and mapped to specified resource elements every five subframes with subframe offsets selected from (0,3,4), (0,3) (0,4), or (3,4) for Type 2 frame structures. In another embodiment, the processing circuitry may be configured to receive or transmit two CSI reference signals contained within specified subframes used by the eNB to transmit CSI reference signals. In the first embodiment, the processing circuitry may be configured to estimate a timing offset by measuring the phase shift of CSI reference signals across different subcarrier frequencies and configured to estimate a frequency offset by measuring the phase shift of CSI reference signals at different times. The processing circuitry of the first embodiment may be further configured to average the measured phase shift of CSI reference signals across different subcarrier frequencies at different times in order to estimate the timing offset and configured to average the measured phase shift of CSI reference signals at different times across different subcarrier frequencies to estimate the frequency offset.

In either of first or second embodiments, the processing circuitry may configured to: receive or transmit OFDM symbols with a normal cyclic prefix; receive or transmit the CSI reference signals in subframes designated for carrying CSI reference signals with the CSI reference signals mapped to resource elements (k,l), where k and l are indices in the frequency and time domain, respectively, wherein:

k=k'+m+0 for antenna ports p15 and p16,
k=k'+m+−6 for antenna ports p17 and p18,
k=k'+m+−1 for antenna ports p19 and p20,
k=k'+m+−7 for antenna ports p21 and p22,
m=0, 1, . . . $N_{RB}$−1, where $N_{RB}$ is the number of resource blocks in a downlink slot,
l=l'+l",
l"=0, 1; and, receive or transmit CSI reference signals in a CSI configuration selected from the following:
1) (k',l')=(9,5) in each slot of a subframe designated to carry CSI reference signals using two antenna ports p15 and p16, (k',l')=(9,5) in each slot of a subframe designated to carry CSI reference signals using four antenna ports p15 through p18, and (k',l')=(9,5) in each slot of a subframe designated to carry CSI reference signals using eight antenna ports p15 through p22;
2) (k',l')=(8,5) in each slot of a subframe designated to carry CSI reference signals using two antenna ports p15 and p16, (k',l')=(8,5) in each slot of a subframe designated to carry CSI reference signals using four antenna ports p15 through p18;

3) (k',l')=(3,5) in each slot of a subframe designated to carry CSI reference signals using two antenna ports p15 and p16;

4) (k',l')=(2,5) in each slot of a subframe designated to carry CSI reference signals using two antenna ports p15 and p16;

5) (k',l')=(9,5) in each slot of a subframe designated to carry CSI reference signals using two antenna ports p15 and p16, (k',l')=(9,5) in each slot of a subframe designated to carry CSI reference signals using four antenna ports p15 through p18, and (k',l')=(9,5) in the first slot only of a subframe designated to carry CSI reference signals using eight antenna ports p15 through p22;

6) (k',l')=(9,5) in each slot of a subframe designated to carry CSI reference signals using two antenna ports p15 and p16, (k',l')=(9,5) in the first slot only of a subframe designated to carry CSI reference signals using four antenna ports p15 through p18, and (k',l')=(9,5) in the first slot only of a subframe designated to carry CSI reference signals using eight antenna ports p15 through p22; or 7) (k',l')=(8,5) in each slot of a subframe designated to carry CSI reference signals using two antenna ports p15 and p16, and (k',l')=(8,5) in the first slot only of a subframe designated to carry CSI reference signals using four antenna ports p15 through p18.

In either of first or second embodiments, the processing circuitry may configured to: receive or transmit OFDM symbols with an extended cyclic prefix; receive or transmit the CSI reference signals in subframes designated for carrying CSI reference signals with the CSI reference signals mapped to resource elements (k,l), where k and l are indices in the frequency and time domain, respectively, wherein:

k=k'+m+0 for antenna ports p15 and p16,
k=k'+m+−3 for antenna ports p17 and p18,
k=k'+m+−6 for antenna ports p19 and p20,
k=k'+m+−9 for antenna ports p21 and p22,
m=0, 1, ... $N_{RB}$−1, where $N_{RB}$ is the number of resource blocks in a downlink slot,
l=l'+l",
l"=0, 1; and, receive or transmit CSI reference signals in a CSI configuration selected from the following:

1) (k',l')=(9,4) in each slot of a subframe designated to carry CSI reference signals using two antenna ports p15 and p16, (k',l')=(9,4) in each slot of a subframe designated to carry CSI reference signals using four antenna ports p15 through p18, and (k',l')=(9,4) in each slot of a subframe designated to carry CSI reference signals using eight antenna ports p15 through p22;

2) (k',l')=(3,4) in each slot of a subframe designated to carry CSI reference signals using two antenna ports p15 and p16, (k',l')=(3,4) in each slot of a subframe designated to carry CSI reference signals using four antenna ports p15 through p18;

3) (k',l')=(6,4) in each slot of a subframe designated to carry CSI reference signals using two antenna ports p15 and p16;

4) (k',l')=(0,4) in each slot of a subframe designated to carry CSI reference signals using two antenna ports p15 and p16;

5) (k',l')=(9,4) in each slot of a subframe designated to carry CSI reference signals using two antenna ports p15 and p16, (k',l')=(9,4) in each slot of a subframe designated to carry CSI reference signals using four antenna ports p15 through p18, and (k',l')=(9,4) in the first slot only of a subframe designated to carry CSI reference signals using eight antenna ports p15 through p22;

6) (k',l')=(9,4) in each slot of a subframe designated to carry CSI reference signals using two antenna ports p15 and p16, (k',l')=(9,4) in the first slot only of a subframe designated to carry CSI reference signals using four antenna ports p15 through p18, and (k',l')=(9,4) in the first slot only of a subframe designated to carry CSI reference signals using eight antenna ports p15 through p22; or 7) (k',l')=(3,4) in each slot of a subframe designated to carry CSI reference signals using two antenna ports p15 and p16, and (k',l')=(3,4) in the first slot only of a subframe designated to carry CSI reference signals using four antenna ports p15 through p18.

In a third embodiment, a device operating as a DE in an LTE network comprises: an RF transceiver for providing an LTE air interface for communicating with a base station operating as an eNB; processing circuitry configured to attach to the eNB via component carriers configured as primary and secondary cells (PCells and SCells), wherein the secondary cell carrier does not include CRSs; and wherein the processing circuitry is further configured to receive UE-specific reference signals (UERSs) over the SCell carrier in an enhanced physical downlink control channel (ePDCCH) and further configured to use the UERSs for time and frequency synchronization; and, wherein the processing circuitry is configured to receive a specified number of resource blocks reserved in each slot of each subframe for the ePDCCH where UERSs are always transmitted.

In a fourth embodiment, a device operating as an eNB in an LTE network, comprises: an RF transceiver for providing an LTE air interface for communicating with UE; processing circuitry configured to attach to UEs via component carriers configured as primary and secondary cells (PCells and SCells), wherein the secondary cell carrier does not include CRSs; wherein the processing circuitry is further configured to transmit UERSs over the SCell carrier in an enhanced physical downlink control channel (ePDCCH) for use by the UE in performing time and frequency synchronization; and, wherein the processing circuitry is configured to transmit a specified number of resource blocks reserved in each slot of each subframe for the ePDCCH where UERSs are always transmitted.

In either of the third or fourth embodiments, the processing circuitry may be configured to configured to receive or transmit the UERS in each of the specified resource blocks with predefined precoding that is constant across the subframe but changes from resource block to resource block in the frequency domain. In either of the third or fourth embodiments, the processing circuitry may be configured to configured to receive or transmit the UERS in each of the specified resource blocks with predefined precoding that alternates with each successive resource block in the time domain.

The embodiments as described above may be implemented in various hardware configurations that may include a processor for executing instructions that perform the techniques described. Such instructions may be contained in a suitable storage medium from which they are transferred to a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as eNode-B.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to 1/10 of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A device for a user equipment (UE), comprising:
an RF transceiver for providing an LTE air interface for communicating with a base station operating as an enhanced/evolved Node B (eNB);
processing circuitry configured to attach to the eNB via component carriers configured as primary and secondary cells (PCells and SCells), wherein the secondary cell carrier does not include cell-specific reference signals (CRSs);
wherein the processing circuitry is further configured to receive channel state information reference signals (CSI reference signals) over the SCell carrier and further configured to use the CSI reference signals for time and frequency synchronization; and,
wherein the processing circuitry is configured to estimate a timing offset by measuring a phase shift of the CSI reference signals across different subcarrier frequencies and configured to estimate a frequency offset by measuring the phase shift of the CSI reference signals at different times.

2. The device of claim 1 wherein the processing circuitry is configured to receive the CSI reference signals mapped to specified resource elements every one, two, three, or four subframes for Type 1 frame structures and to receive the CSI reference signals mapped to specified resource elements every five subframes with subframe offsets selected from (0,3,4), (0,3) (0,4), or (3,4) for Type 2 frame structures.

3. The device of claim 1 wherein the processing circuitry is configured to receive two CSI reference signals contained within specified subframes used by the eNB to transmit CSI reference signals.

4. The device of claim 1 wherein the processing circuitry is configured to:
receive OFDM symbols with a normal cyclic prefix;
receive the CSI reference signals in subframes designated for carrying CSI reference signals with the CSI reference signals mapped to resource elements (k,l), where k and l are indices in the frequency and time domain, respectively, wherein:
k=k'+m+0 for antenna ports p15 and p16,
k=k'+m+−6 for antenna ports p17 and p18,
k=k'+m+−1 for antenna ports p19 and p20,
k=k'+m+−7 for antenna ports p21 and p22,
m=0, 1, ... $N_{RB}$−1, where $N_{RB}$ is the number of resource blocks in a downlink slot,
l=l'+l",
l"=0, 1; and,
receive CSI reference signals in a CSI configuration selected from the following:
1) (k',l')=(9,5) in each slot of a subframe designated to carry CSI reference signals using two antenna ports p15 and p16, (k',l')=(9,5) in each slot of a subframe designated to carry CSI reference signals using four antenna ports p15 through p18, and (k',l')=(9,5) in each slot of a subframe designated to carry CSI reference signals using eight antenna ports p15 through p22;
2) (k',l')=(8,5) in each slot of a subframe designated to carry CSI reference signals using two antenna ports p15 and p16, (k',l')=(8,5) in each slot of a subframe designated to carry CSI reference signals using four antenna ports p15 through p18;
3) (k',l')=(3,5) in each slot of a subframe designated to carry CSI reference signals using two antenna ports p15 and p16;

4) (k',l')=(2,5) in each slot of a subframe designated to carry CSI reference signals using two antenna ports p15 and p16;

5) (k',l')=(9,5) in each slot of a subframe designated to carry CSI reference signals using two antenna ports p15 and p16, (k',l')=(9,5) in each slot of a subframe designated to carry CSI reference signals using four antenna ports p15 through p18, and (k',l')=(9,5) in the first slot only of a subframe designated to carry CSI reference signals using eight antenna ports p15 through p22;

6) (k',l')=(9,5) in each slot of a subframe designated to carry CSI reference signals using two antenna ports p15 and p16, (k',l')=(9,5) in the first slot only of a subframe designated to carry CSI reference signals using four antenna ports p15 through p18, and (k',l')=(9,5) in the first slot only of a subframe designated to carry CSI reference signals using eight antenna ports p15 through p22; or, 7) (k',l')=(8,5) in each slot of a subframe designated to carry CSI reference signals using two antenna ports p15 and p16, and (k',l')=(8,5) in the first slot only of a subframe designated to carry CSI reference signals using four antenna ports p15 through p18.

5. The device of claim 4 wherein the processing circuitry is configured to receive the CSI reference signals mapped to specified resource elements every one, two, three, or four subframes for Type 1 frame structures and to receive the CSI reference signals mapped to specified resource elements every five subframes with subframe offsets selected from (0,3,4), (0,3) (0,4), or (3,4) for Type 2 frame structures.

6. The device of claim 1 wherein the processing circuitry is configured to:
receive OFDM symbols with an extended cyclic prefix;
receive the CSI reference signals in subframes designated for carrying CSI reference signals with the CSI reference signals mapped to resource elements (k,l), where k and l are indices in the frequency and time domain, respectively, wherein:
k=k'+m+0 for antenna ports p15 and p16,
k=k'+m+−3 for antenna ports p17 and p18,
k=k'+m+−6 for antenna ports p19 and p20,
k=k'++−9 for antenna ports p21 and p22,
m=0, 1, ... $N_{RB}$−1, where $N_{RB}$ is the number of resource blocks in a downlink slot,
l=l'+l",
l"=0, 1; and,
receive CSI reference signals in a CSI configuration selected from the following:

1) (k',l')=(9,4) in each slot of a subframe designated to carry CSI reference signals using two antenna ports p15 and p16, (k',l')=(9,4) in each slot of a subframe designated to carry CSI reference signals using four antenna ports p15 through p18, and (k',l')=(9,4) in each slot of a subframe designated to carry CSI reference signals using eight antenna ports p15 through p22;

2) (k',l')=(3,4) in each slot of a subframe designated to carry CSI reference signals using two antenna ports p15 and p16, (k',l')=(3,4) in each slot of a subframe designated to carry CSI reference signals using four antenna ports p15 through p18;

3) (k',l')=(6,4) in each slot of a subframe designated to carry CSI reference signals using two antenna ports p15 and p16;

4) (k',l')=(0,4) in each slot of a subframe designated to carry CSI reference signals using two antenna ports p15 and p16;

5) (k',l')=(9,4) in each slot of a subframe designated to carry CSI reference signals using two antenna ports p15 and p16, (k',l')=(9,4) in each slot of a subframe designated to carry CSI reference signals using four antenna ports p15 through p18, and (k',l')=(9,4) in the first slot only of a subframe designated to carry CSI reference signals using eight antenna ports p15 through p22;

6) (k',l')=(9,4) in each slot of a subframe designated to carry CSI reference signals using two antenna ports p15 and p16, (k',l')=(9,4) in the first slot only of a subframe designated to carry CSI reference signals using four antenna ports p15 through p18, and (k',l')=(9,4) in the first slot only of a subframe designated to carry CSI reference signals using eight antenna ports p15 through p22; or, 7) (k',l')=(3,4) in each slot of a subframe designated to carry CSI reference signals using two antenna ports p15 and p16, and (k',l')=(3,4) in the first slot only of a subframe designated to carry CSI reference signals using four antenna ports p15 through p18.

7. The device of claim 6 wherein the processing circuitry is configured to receive the CSI reference signals mapped to specified resource elements every one, two, three, or four subframes for Type 1 frame structures and to receive the CSI reference signals mapped to specified resource elements every five subframes with subframe offsets selected from (0,3,4), (0,3) (0,4), or (3,4) for Type 2 frame structures.

8. The device of claim 1 wherein the processing circuitry is configured to average the measured phase shift of CSI reference signals across different subcarrier frequencies at different times in order to estimate the timing offset and configured to average the measured phase shift of CSI reference signals at different times across different subcarrier frequencies to estimate the frequency offset.

9. A non-transitory computer-readable medium comprising instructions to cause a user equipment (UE), upon execution of the instructions by processing circuitry of the UE, to:
communicate with an enhanced/evolved Node B (eNB) over an LTE air interface;
attach to the eNB via component carriers configured as primary and secondary cells (PCells and SCells), wherein the secondary cell carrier does not include cell-specific reference signals (CRSs);
receive channel state information reference signals (CSI reference signals) over the SCell carrier and further configured to use the CSI reference signals for time and frequency synchronization; and,
estimate a timing offset by measuring a phase shift of the CSI reference signals across different subcarrier frequencies and configured to estimate a frequency offset by measuring the phase shift of the CSI reference signals at different times.

10. The medium of claim 9 further comprising instructions to receive the CSI reference signals mapped to specified resource elements every one, two, three, or four subframes for Type 1 frame structures and to receive the CSI reference signals mapped to specified resource elements every five subframes with subframe offsets selected from (0,3,4), (0,3) (0,4), or (3,4) for Type 2 frame structures.

11. The medium of claim 9 further comprising instructions to receive two CSI reference signals contained within specified subframes used by the eNB to transmit CSI reference signals.

12. The medium of claim 9 further comprising instructions to:
receive OFDM symbols with a normal cyclic prefix;
receive the CSI reference signals in subframes designated for carrying CSI reference signals with the CSI reference signals mapped to resource elements (k,l), where k and l are indices in the frequency and time domain, respectively, wherein:
$k=k'+m+0$ for antenna ports p15 and p16,
$k=k'+m+-6$ for antenna ports p17 and p18,
$k=k'+m+-1$ for antenna ports p19 and p20,
$k=k'+m+-7$ for antenna ports p21 and p22,
$m=0, 1, \ldots N_{RB}-1$, where $N_{RB}$ is the number of resource blocks in a downlink slot,
l=l'+l'',
l''=0, 1; and,
receive CSI reference signals in a CSI configuration selected from the following:
1) (k',l')=(9,5) in each slot of a subframe designated to carry CSI reference signals using two antenna ports p15 and p16, (k',l')=(9,5) in each slot of a subframe designated to carry CSI reference signals using four antenna ports p15 through p18, and (k',l')=(9,5) in each slot of a subframe designated to carry CSI reference signals using eight antenna ports p15 though p22;
2) (k',l')=(8,5) in each slot of a subframe designated to carry CSI reference signals using two antenna ports p15 and p16, (k',l')=(8,5) in each slot of a subframe designated to carry CSI reference signals using four antenna ports p15 through p18;
3) (k',l')=(3,5) in each slot of a subframe designated to carry CSI reference signals using two antenna ports p15 and p16;
4) (k',l')=(2,5) in each slot of a subframe designated to carry CSI reference signals using two antenna ports p15 and p16;
5) (k'l')=(9,5) in each slot of a subframe designated to carry CSI reference signals using two antenna ports p15 and p16, (k',l')=(9,5) in each slot of a subframe designated to carry CSI reference signals using four antenna ports p15 through p18, and (k',l')=(9,5) in the first slot only of a subframe designated to carry CSI reference signals using eight antenna ports p15 through p22;
6) (k',l')=(9,5) in each slot of a subframe designated to carry CSI reference signals using two antenna ports p15 and p16, (k',l')=(9,5) in the first slot only of a subframe designated to carry CSI reference signals using four antenna ports p15 through p18, and (k',l')=(9,5) in the first slot only of a subframe designated to carry CSI reference signals using eight antenna ports p15 through p22; or,
7) (k',l')=(8,5) in each slot of a subframe designated to carry CSI reference signals using two antenna ports p15 and p16, and (k',l')=(8,5) in the first slot only of a subframe designated to carry CSI reference signals using four antenna ports p15 through p18.

13. The medium of claim 12 further comprising instructions to receive the CSI reference signals mapped to specified resource elements every one, two, three, or four subframes for Type 1 frame structures and to receive the CSI reference signals mapped to specified resource elements every five subframes with subframe offsets selected from (0,3,4), (0,3) (0,4), or (3,4) for Type 2 frame structure.

14. The medium of claim 9 further comprising instructions to:
receive OFDM symbols with an extended cyclic prefix;
reference the CSI reference signals in subframes designated for carrying CSI reference signals with the CSI reference signals mapped to resource elements (k,l), where k and l are indices in the frequency and time domain, respectively, wherein:
$k=k'+m+0$ for antenna ports p15 and p16,
$k=k'+m+-6$ for antenna ports p17 and p18,
$k=k'+m+-1$ for antenna ports p19 and p20,
$k=k'+m+-7$ for antenna ports p21 and p22,
$m=0, 1, \ldots N_{RB}-1$, where $N_{RB}$ is the number of resource blocks in a downlink slot,
l=l'+l'',
l''=0, 1; and,
receive CSI reference signals in a CSI configuration selected from the following:
1) (k',l')=(9,4) in each slot of a subframe designated to carry CSI reference signals using two antenna ports p15 and p16, (k',l')=(9,4) in each slot of a subframe designated to carry CSI reference signals using four antenna ports p15 through p18, and (k',l')=(9,4) in each slot of a subframe designated to carry CSI reference signals using eight antenna ports p15 though p22;
2) (k',l')=(3,4) in each slot of a subframe designated to carry CSI reference signals using two antenna ports p15 and p16, (k',l')=(3,4) in each slot of a subframe designated to carry CSI reference signals using four antenna ports p15 through p18;
3) (k',l')=(6,4) in each slot of a subframe designated to carry CSI reference signals using two antenna ports p15 and p16;
4) (k',l')=(0,4) in each slot of a subframe designated to carry CSI reference signals using two antenna ports p15 and p16;
5) (k'l')=(9,4) in each slot of a subframe designated to carry CSI reference signals using two antenna ports p15 and p16, (k',l')=(9,4) in each slot of a subframe designated to carry CSI reference signals using four antenna ports p15 through p18, and (k',l')=(9,4) in the first slot only of a subframe designated to carry CSI reference signals using eight antenna ports p15 through p22;
6) (k',l')=(9,4) in each slot of a subframe designated to carry CSI reference signals using two antenna ports p15 and p16, (k',l')=(9,4) in the first slot only of a subframe designated to carry CSI reference signals using four antenna ports p15 through p18, and (k',l')=(9,4) in the first slot only of a subframe designated to carry CSI reference signals using eight antenna ports p15 through p22; or,
7) (k',l')=(3,4) in each slot of a subframe designated to carry CSI reference signals using two antenna ports p15 and p16, and (k',l')=(3,4) in the first slot only of a subframe designated to carry CSI reference signals using four antenna ports p15 through p18.

15. The medium of claim 14 further comprising instructions The device of claim 6 wherein the processing circuitry is configured to receive the CSI reference signals mapped to specified resource elements every one, two, three, or four subframes for Type 1 frame structures and to receive the CSI reference signals mapped to specified resource elements every five subframes with subframe offsets selected from (0,3,4), (0,3) (0,4), or (3,4) for Type 2 frame structures.

16. The medium of claim 9 further comprising instructions to average the measured phase shift of CSI reference signals across different subcarrier frequencies at different times in order to estimate the timing offset and configured to average the measured phase shift of CSI reference signals at different times across different subcarrier frequencies to estimate the frequency offset.

17. A method for operating a user equipment (UE), comprising:
 communicating with an enhanced/evolved Node B (eNB) over an LTE air interface;
 attaching to the eNB via component carriers configured as primary and secondary cells (PCells and SCells), wherein the secondary cell carrier does not include cell-specific reference signals (CRSs);
 receiving channel state information reference signals (CSI reference signals) over the SCell carrier and further configured to use the CSI reference signals for time and frequency synchronization; and,
 estimating a timing offset by measuring a phase shift of the CSI reference signals across different subcarrier frequencies and configured to estimate a frequency offset by measuring the phase shift of the CSI reference signals at different times.

18. The method of claim 17 further comprising receiving the CSI reference signals mapped to specified resource elements every one, two, three, or four subframes for Type 1 frame structures and to receive the CSI reference signals mapped to specified resource elements every five subframes with subframe offsets selected from (0,3,4), (0,3) (0,4), or (3,4) for Type 2 frame structures.

19. The method of claim 17 further comprising receiving two CSI reference signals contained within specified subframes used by the eNB to transmit CSI reference signals.

20. The method of claim 17 further comprising averaging the measured phase shift of CSI reference signals across different subcarrier frequencies at different times in order to estimate the timing offset and configured to average the measured phase shift of CSI reference signals at different times across different subcarrier frequencies to estimate the frequency offset.

\* \* \* \* \*